May 4, 1965  F. STELZEN  3,181,198
FISH HOLDER AND SCRAPER
Filed Oct. 21, 1963
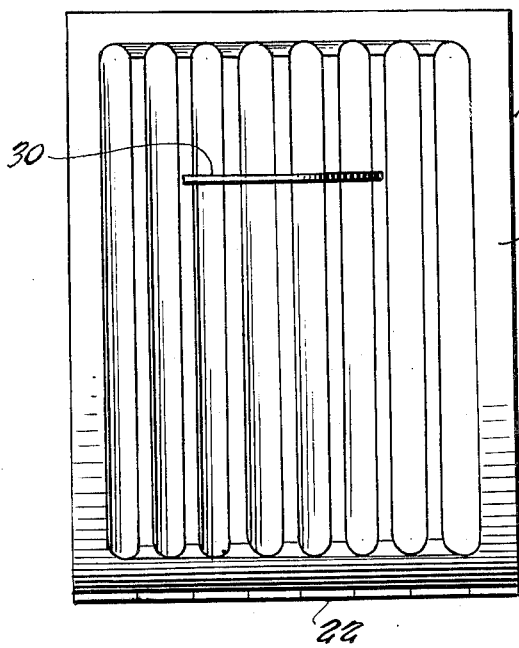
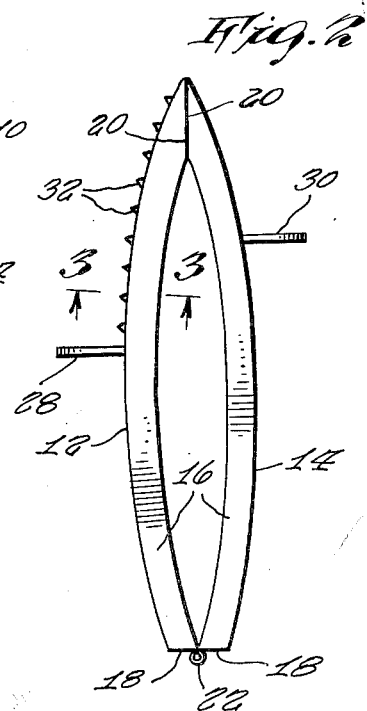
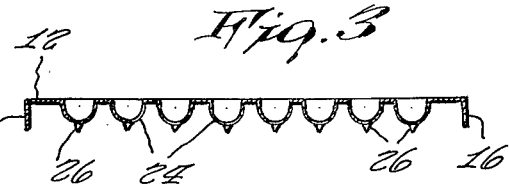
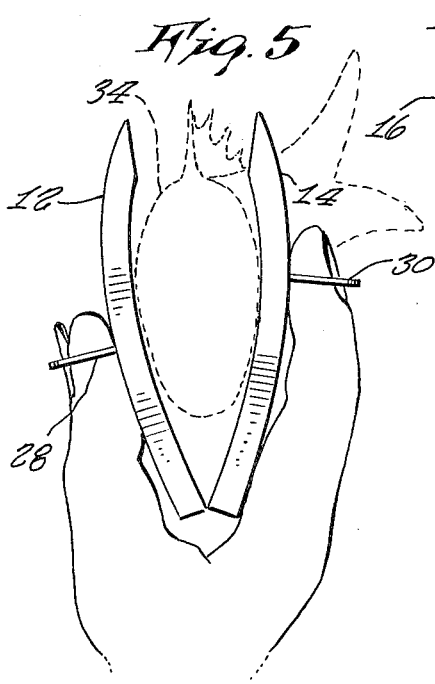
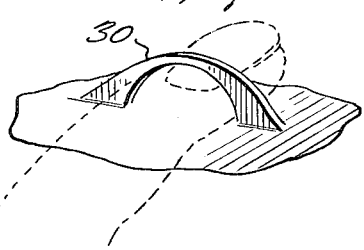
INVENTOR.
FRED STELZEN
BY
Carl Miller
ATTORNEY

3,181,198
FISH HOLDER AND SCRAPER
Fred Stelzen, 201 Lincoln Ave., Clifton, N.J.
Filed Oct. 21, 1963, Ser. No. 317,699
2 Claims. (Cl. 17—8)

This invention relates in general to a combined fish holder and scraping device.

One object of the invention is to provide a hand-held grasping device that is opened and closed by the action of the thumb and forefinger, and embodying novel and improved features for securely holding a fish, and without danger of injury to the hand.

Another object of this invention is to provide a device of this character having a pair of longitudinally arcuate plate members hinged together at one transverse end with a finger grip provided exteriorly on each plate member, the device being of a size such as to be easily held in the palm of a hand with the thumb and forefinger, each insertable in an adjacent finger grip.

A still further object of this invention is to provide each of the plate members with inwardly projected corrugations and with each corrugation provided with a row of prongs or protuberances for gripping the fish.

An additional object of this invention is to provide on an exterior portion of one of the hinged plate members, rows of teeth to be utilized for scraping or scaling fish.

The invention further consists in the several features hereinafter described and more particularly pointed out in the appended claims.

In the drawings:

FIGURE 1 is a top view of the fish holder and scraping device.

FIGURE 2 is a side elevational view thereof.

FIGURE 3 is a cross-section taken on line 3—3 of FIGURE 2.

FIGURE 4 is a detail perspective view of a finger grip on the device.

FIGURE 5 illustrates the device as held in the hand and in operative use.

Referring to FIGURES 1 and 2 of the drawings, it will be seen that the fish holding and scraping device 10 is formed of two like longitudinally arcuate rectangular plate members 12 and 14, made of sheet metal or any other suitable material. Each plate member is provided along each side thereof with a side flange 16 having square ends 18 at their rear ends and beveled ends 20 at their forward ends. The plate members 12, 14 are hinged together at their rear ends by a suitable hinge 22 with each plate member bowing away from the other, see FIGURE 2, and in the closed position, the beveled edges 20 of the side flanges 16 will abut each other.

The plate members 12, 14 are each similarly formed with a plurality of inwardly directed longitudinally extending narrow corrugations 24 closely adjacent to each other, and provided on each corrugation is a longitudinal row of small prongs 26, see FIGURE 3, that project slightly beyond the edges of side-flanges 16. The corrugations 24 as shown in FIGURE 1, are of equal length and extend from adjacent the hinged ends of the plate members to adjacent the free forward ends thereof.

Provided exteriorly on plate member 12 is a finger grip 28, and another finger grip 30 is similarly provided on plate member 14. Both finger grips 28, 30 are in the form of loops upstanding from the outer surface of their respective plate members. Preferably the finger grip 28 is positioned at the center of the plate member 12, while the finger grip 30 is located at least three-quarter way up from the hinge on plate member 14.

Formed exteriorly of plate member 12 and forwardly of finger grip 28 are rows of spaced scraping teeth 32 that are used for scaling fish.

In use, the device is placed in the palm of the hand, see FIGURE 5, with the hinge lying between the thumb and forefinger, and with the thumb and forefinger respectively engaged within the finger grips 28 and 30. Movement of the thumb and forefinger will thus open or close the device. As shown in FIGURE 5, the device is shown open and a fish 34 grasped between the plate members 12, 14.

It will be apparent that a fish may be safely and securely grasped by the device held in the hand without danger of the hand touching the spines on the fish. The device will securely grasp live slippery fish with ease, and has many other uses such as handling snakes, briers, or anything slippery.

I desire it to be understood that this invention is not to be limited to any particular form or arrangement of parts, except in so far as such limitations may be included in the claims.

What I claim as my invention is:
1. A hand-held fish holding device comprising:
   (a) a pair of rectangular longitudinally bowed plate members;
   (b) an inwardly directed longitudinal side-flange at each side of each plate member and extending the full length thereof;
   (c) said plate members being arranged in oppositely bowed relation with corresponding side-flanges disposed in opposed relation;
   (d) a hinge connecting said plate members together at corresponding rear ends thereof;
   (e) a plurality of longitudinal closely spaced narrow corrugations of equal length formed in each plate member with the ends thereof terminating short of the ends of said plate member;
   (f) said corrugations being each arcuate in cross-section and positioned inwardly of the outside surface of each plate member so as to lie between the side-flanges thereof and of a depth slightly less than the depth of said side-flanges;
   (g) a longitudinal row of prongs on each corrugation projecting inwardly of each plate member;
   (h) the terminal ends of said side-flanges at the free forward ends of said plate members being correspondingly beveled such as to seat one on the other in the closed portion of said plate members;
   (i) a rigid single finger grip on one plate member positioned centrally on the outer side thereof to receive therein the thumb of a hand, and
   (j) a rigid single finger grip on the outerside of the other plate member positioned thereon substantially midway between the first mentioned finger grip and the free forward edge of said other plate member to receive the forefinger of the hand.

2. The hand-held fish holding device of claim 1, including:
   (a) scaling teeth on the outer side of said plate member having the thumb receiving finger grip and located thereon between said finger grip and the free forward end of said plate member.

References Cited by the Examiner
UNITED STATES PATENTS

| | | | |
|---|---|---|---|
| D. 188,383 | 7/60 | Grauning. | |
| 717,206 | 12/02 | Jacoby | 17—7 |
| 2,244,072 | 6/41 | Ledbetter | 294—25 |
| 2,800,356 | 7/57 | Benton | 294—106 |
| 2,881,022 | 4/59 | Brust | 294—106 X |

SAMUEL KOREN, *Primary Examiner.*
LUCIE H. LAUDENSLAGER, *Examiner.*